United States Patent [19]

Yeh

[11] Patent Number: 4,972,892

[45] Date of Patent: Nov. 27, 1990

[54] VEHICLE COVER AND METHOD OF MAKING SAME

[76] Inventor: George C. Yeh, 2 Smedley Dr., Newtown Square, Pa. 19073

[21] Appl. No.: 483,082

[22] Filed: Feb. 21, 1990

[51] Int. Cl.$^5$ ............................................. A60J 11/00
[52] U.S. Cl. ................................. 150/166; 160/370.2; 296/95.1; 296/136
[58] Field of Search ............................... 150/166–168; 296/95.1, 136; 160/370.2

[56] References Cited

U.S. PATENT DOCUMENTS

| | | | |
|---|---|---|---|
| 1,767,447 | 6/1930 | Griffith | 150/166 X |
| 2,311,514 | 2/1943 | Bramblett | 150/166 |
| 2,646,097 | 7/1953 | Gaverth et al. | 150/166 |
| 2,787,311 | 4/1957 | Cohen et al. | 150/166 |
| 2,821,248 | 1/1958 | Irvine | 296/95.1 X |
| 3,175,859 | 3/1965 | Abodeely . | |
| 3,241,877 | 3/1966 | Tate . | |
| 3,763,908 | 10/1979 | Norman . | |
| 3,910,330 | 10/1975 | Johnson et al. . | |
| 4,041,999 | 9/1977 | Miller | 150/166 |
| 4,209,197 | 6/1980 | Fischer | 296/95.1 X |
| 4,216,989 | 8/1980 | Tackett | 150/166 X |
| 4,842,324 | 6/1989 | Carden | 296/136 |
| 4,850,635 | 7/1989 | Lindell | 296/136 |

FOREIGN PATENT DOCUMENTS

| | | | |
|---|---|---|---|
| 488356 | 11/1975 | Australia | 296/136 |
| 3736234 | 5/1989 | Fed. Rep. of Germany | 296/95.1 |
| 1559176 | 1/1980 | United Kingdom | 150/166 |

Primary Examiner—Sue A. Weaver
Attorney, Agent, or Firm—Howson and Howson

[57] ABSTRACT

An all-seasons cover for enclosing the roof and windows of a passenger vehicle or the like. A flexible sheet of material, when laid out completely flat, defines a generally rectangular center section substantially conforming to the roof area; and front, rear and side sections foldable downward to cover the windows. The front margins of the side sections are indented to receive appendages of the side mirrors. The corners of adjacent sections overlap when installed on the vehicle, and fasteners fixed to the panels extend across the corners to secure the cover.

2 Claims, 2 Drawing Sheets

VEHICLE COVER AND METHOD OF MAKING SAME

BACKGROUND OF THE INVENTION

The present invention relates to vehicle covers, and more particularly to an all-seasons cover suitable for fitting over the roof and window areas of a vehicle such as an automobile, truck cab, boat or the like.

The interior of a vehicle parked outdoors in the summer sun can become extremely warm and uncomfortable for its occupants, and in the winter the windows may be blinded by snow, ice or frost. Direct sunlight is also especially damaging to the upholstery, dashboards, and steering wheels causing them to fade, dry out or crack. Conventional automobile covers are seldom used in public parking areas because their sack-like shape lacks a pleasing appearance. They are usually designed to cover the entire vehicle or are tailored to its contour but, because of their shape and size, are often difficult to slip on, especially in wind. Furthermore, such covers are inconvenient to carry in the vehicle because they cannot be easily folded and compactly stored due to their large size and clumsy design.

SUMMARY OF THE INVENTION

It is therefore an object of the present invention to provide a cover for the roof and upper areas of a vehicle which is suitable for use in all seasons, especially for keeping the interior occupant space cooler during hot summers and for keeping the window areas free from frost, ice and snow during cold winters, and which provides privacy and added security for the contents inside the vehicle.

Another object is to provide a cover which can be quickly and easily installed and fitted on the roof and all the window areas of a vehicle by one person, and which is made of flexible lightweight material that can be laid out flat and compactly folded and stored in the vehicle when not in use.

Still another object is to provide a vehicle cover which can be used reversibly for exposing either side, and which can display a distinct and attractive design for easy recognition from afar.

A still further object is to provide a method of fabricating a vehicle cover which makes efficient use of materials and requires minimal skills for fabrication and assembly.

Briefly these and other objects and aspects of the invention are achieved by providing a vehicle cover of flexible sheet material having the general shape, when laid out flat, of a rectangular center section conforming to the roof area; and front, rear and opposite side sections extending from the border of the center section and conforming to the respective window areas. When the center section is aligned on the roof of the vehicle, the other sections fold downwardly and completely cover the windows with the side sections underlapping the front and rear sections at the corners to form a snug hat-like fit with the contour of the automobile. Each side section adjacent to the front window is indented along the outer edge to accommodate sideview mirrors which may extend from either side of the vehicle. Interlocking security straps attached to the front, rear and side sections, and magnets at the edges, maintain a secure fit. Due to its abbreviated size compared to existing covers, a cover according to the invention can be easily installed on the vehicle or folded and compactly stored in the vehicle.

For a better understanding of these and other objects and advantages of the invention, reference will be made to the following detailed description of the invention considered in conjunction with the accompanying drawings.

DESCRIPTION OF THE PREFERRED EMBODIMENT

Figure 1:
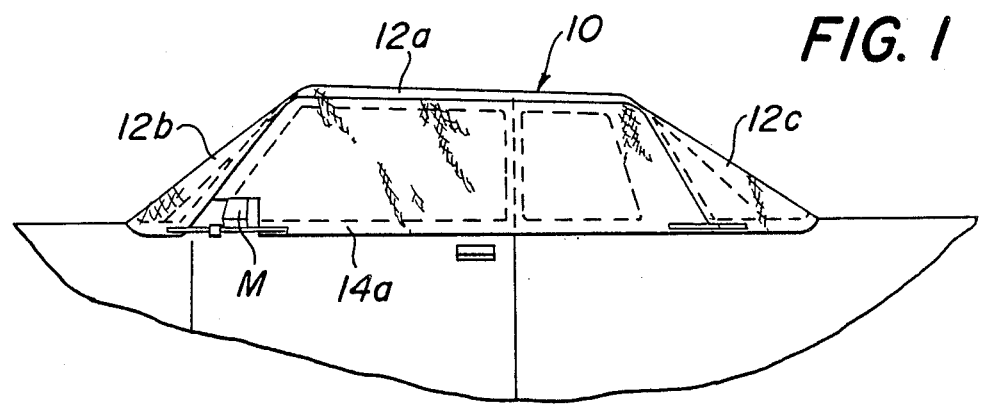
FIG. 1 is a side view of an all-seasons cover according to the invention installed over the roof and windows of a passenger car.
Figure 2:
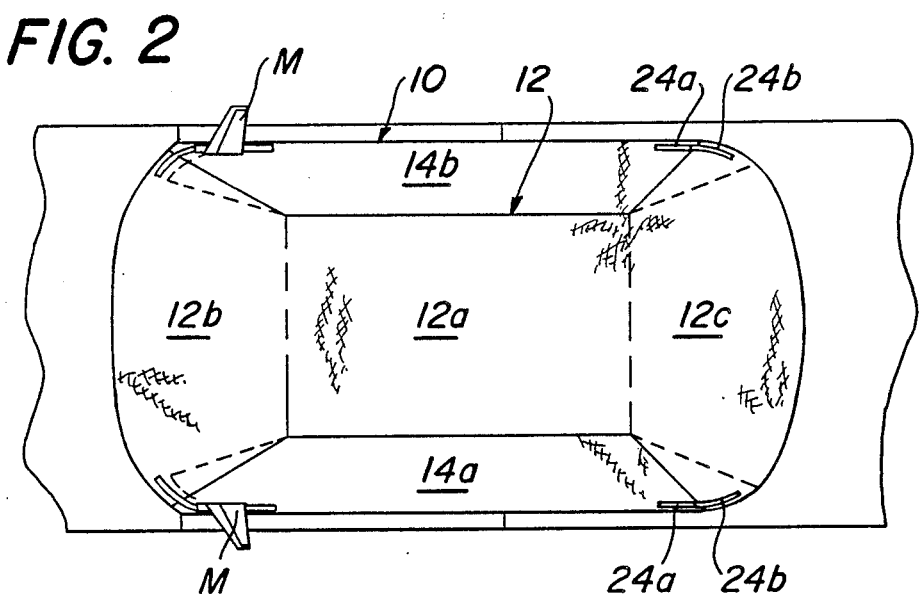
FIG. 2 is a top view of the cover and car of FIG. 1.
Figure 4:
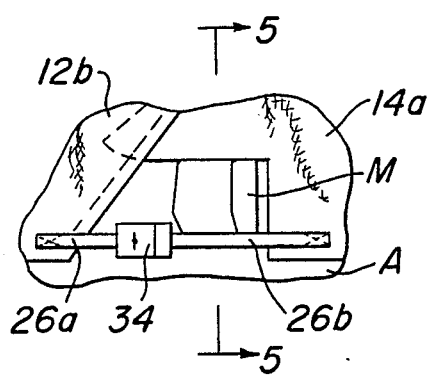
FIG. 4 is an enlarged view of the cover and car of FIG. 1 in the vicinity of the left side mirror.

Referring now to the drawings, in which like characters denote like or corresponding parts throughout the several views, FIGS. 1 and 2 show an all-seasons cover 10 according to the invention installed on a passenger car. Cover 10 is fabricated from flexible material, such as cloth or plastic sheet preferably in three separate panels 12, 14a, and 14b sewn together. It will be apparent that cover 10 may also be cut from a single sheet, but separate panels are preferred because narrower rolls of cloth may be used for easier, more economical fabrication. Various strong, durable materials may be used with the exterior surfaces treated to resist water, rot, mildew, dirt, heat, etc. and to reflect or absorb sunlight. Also, various color patterns, designs and decorations may be applied to the exterior surfaces to provide a distinctive character or appearance.

Figure 3:
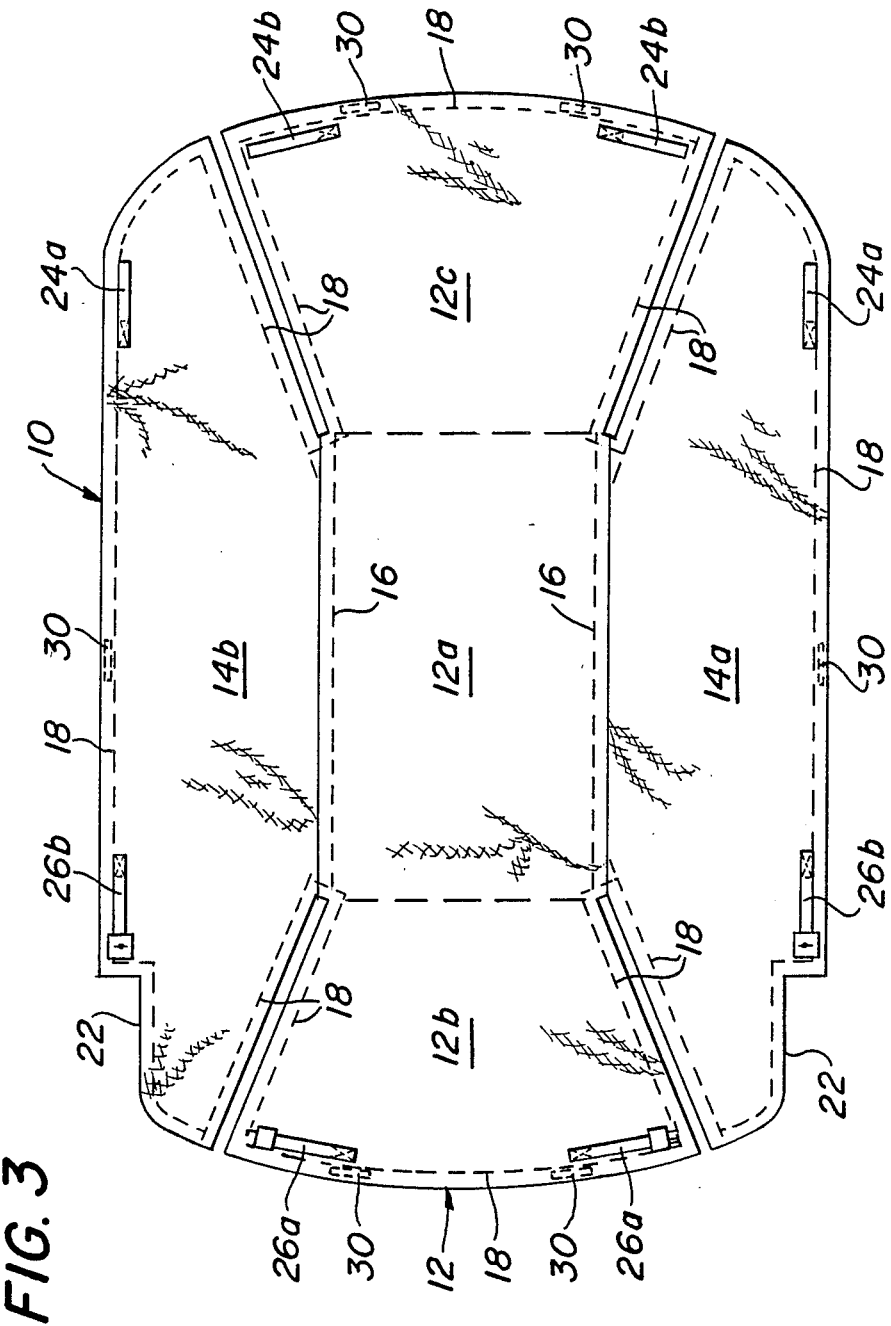
FIG. 3 is a view of the cover of FIG. 1 unfolded and spread out in a flat plane.

Referring to FIG. 3, panel 12 includes a generally rectangular section 12a which is sized to cover the surface area of the car's roof; and sections 12b and 12c, integral with the opposite ends of panel 12a, are sized to completely cover the front and rear window areas, respectively, with a margin of overlap on the metal body of the car below the windows. Of course it is understood that various sizes and shapes are contemplated to fit different models and sizes of vehicles such as compact, intermediate and full size passenger cars, vans, trucks, boats, etc. Panels 14a and 14b are attached, such as by stitching 16, to the opposite sides of panel 12a and are sized to completely cover the side window areas plus a margin of overlap along the metal body below the windows and adjacent areas of the front and rear windows where they underlap when installed on the car. The front portions along the edges of panels 14a and 14b include indentations 22 allowing for the appendages of sideview mirrors M on either side of the car. All the exposed edges of the panels include hems 18 for added strength and resistance to tearing as well as for a pleasing appearance.

Figure 5:
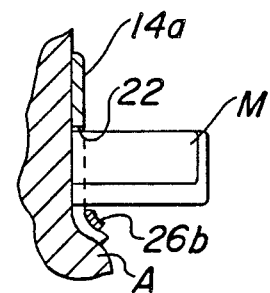
FIG. 5 is a view in partial cross section of the cover and car taken along the line 5—5 of FIG. 4.

When installed on the car, the rearward ends of side panels 14a and 14b underlap rear panel 12c and are secured at the corners formed thereby by interengageable rear fasteners 24a and 24b attached to adjacent outer margins of panels 12b, 14a and 14c. Fasteners 24a and 24b are preferably elastic or adjustable length straps, stitched at the one ends to the panels with snap or hook-and-loop type connectors at the free ends. The front ends of panels 14a and 14b underlap front panel 12b and are secured at the corners formed thereby by interengageable front fasteners 26a and 26b. As best seen in FIG. 5, front fasteners 26a and 26b are elastic or adjustable length straps stitched to adjacent outer margins of panels 12b, 14a and 14c and with buckles 34 attached to the free ends and interlockable with keys. Fasteners 26a and 26b span the indentation beneath side mirrors M when buckles 34 are engaged. Of course it is understood that other front and rear fastener configurations, and their manner of attachment, are possible depending on the degree of security desired. For example, snap or hook-and-loop connectors may be attached to the facing sides of the overlapping panel areas instead of or in addition to the strap type fasteners. It is also contemplated that such fasteners can be attached to the opposite sides of cover 10 enabling it to be completely reversible for a desired external appearance or effect.

Cover 10 is also equipped around the perimeter with magnets 30 to facilitate installation and to maintain a close fitting. Magnets 30 are preferably sewn into hems 18 at selected locations where the perimeter of cover 10 meets metallic parts of the car. A holding force of a few pounds in each magnet is considered sufficient to withstand normal winds for most cover sizes and vehicle shapes.

Installation of the cover 10 should now be apparent. With cover 10 completely unfolded, the center section 12a is aligned on the roof of the car with the side panels folded downwardly over their respective windows and with magnets 30 holding their edges against the metal body portion below the windows. The end corners of panels 14a and 14b are then preferably tucked under the adjacent corners of front and rear panels 12a and 12b to completely enclose the roof and window areas, and the rear fasteners 24a and 24b are engaged across the overlapping areas. The front fasteners 26a and 26b are then engaged and locked by stretching them across indentations 22 and under mirrors M. Thusly, cover 10 may not be removed without damaging the fasteners unless front fasteners 26a and 26b are first unlocked and disengaged.

Cover 10 can be quickly removed from the vehicle by reversing the above installation procedure. It can then be laid out completely flat for folding or rolling up into a compact size suitable for storing in a small bag or compartment within the automobile.

Some of the many advantages and novel features of the invention should now be readily apparent. For example, an all-season vehicle cover is provided which is fabricated from a flexible lightweight material capable of being laid out completely flat for folding or rolling up into a small compact size suitable for storing in a small bag or compartment within the vehicle. Due to its abbreviated size to screen only the roof and windows, the cover can be quickly unfolded and installed on the vehicle by one person under relatively adverse weather conditions. The cover can be reversible such as for reducing the interior temperature of the car in summertime while it is parked in sunlight, or for preventing accummulation of ice, frost or snow in the winter. The cover can be manufactured in several sizes such as for compact, intermediate and full size passenger cars, vans, trucks, boats, or the like; and it can be easily custom-fitted for specific vehicle models, and adapted to cover other parts of the vehicle such as the engine or trunk compartments of a car. The cover may be coated with bright pigments, dyes or aluminum powder to reflect or absorb the sun's rays as well as to create an artistic finish in a distinct and attractive design which may discourage theft of the garment due to its uniqueness.

It will be understood, of course, that various changes in the details, steps, and arrangement of parts, which have been herein described and illustrated in order to explain the nature of the invention, may be made by those skilled in the art within the principal and scope of the invention as expressed in the appended claims.

I claim:

1. A cover for fully covering the roof and upper areas of the front, rear and sides of a vehicle, comprising:
   a flexible flat sheet defining a generally rectangular roof section conforming substantially to the area of the roof, front and rear sections extending respectively from the front and rear boundaries of said roof section and conforming substantially to the front and rear areas of the vehicle, and side sections extending respectively from the opposite side boundaries of said roof section and conforming substantially to the side areas of the vehicle, said side sections further including outer corners for extending beyond adjacent outer corners of said front and rear sections with recesses adjacent to the front edges thereof for receiving appendages of the sideview mirrors on the vehicle;
   fastener means attached to the perimeter of said front, rear and side sections for securing adjacent corners formed when said cover is snugly fitted on the vehicle and at least one of said fastener means attached to said front and side sections including interengaging straps spanning the recesses below the sideview mirrors; and
   locking means secured to said straps for impeding removal of said cover from the vehicle.

2. An all-seasons cover for fully covering the roof and front, rear and side windows of an automobile, comprising:
   a flexible flat sheet defining a generally rectangular roof section conforming substantially to the dimensions of the roof, front and rear sections extending respectively from the front and rear boundaries of said roof section and conforming substantially to the dimensions of the front and rear windows, and first and second side sections extending respectively from the opposite side boundaries of said roof section and conforming substantially to the dimensions of the side windows, said side sections further including outer corners for extending beyond adjacent outer corners of said front and rear sections with recesses adjacent to the front edges thereof for receiving appendages of the sideview mirrors on the automobile;
   fastener means attached to the perimeter of said front, rear and side sections for securing adjacent corners formed when said cover is snugly fitted on the vehicle and at least one of said fastener means attached to said front and side sections includes interengaging straps spanning the recesses below the sideview mirrors; and
   locking means secured to said straps for impeding removal of said cover from the automobile.

* * * * *